United States Patent
Cherifi

(10) Patent No.: US 8,774,835 B2
(45) Date of Patent: Jul. 8, 2014

(54) METHODS, SYSTEMS AND COMPUTER PROGRAM PRODUCTS FOR A REMOTE BUSINESS CONTACT IDENTIFIER

(75) Inventor: Tanya D Cherifi, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 12/494,964

(22) Filed: Jun. 30, 2009

(65) Prior Publication Data
US 2010/0331015 A1    Dec. 30, 2010

(51) Int. Cl.
*H04W 24/00* (2009.01)
*H04L 29/06* (2006.01)
*G06F 7/00* (2006.01)
*G06F 17/30* (2006.01)

(52) U.S. Cl.
USPC ............ 455/456.3; 455/414.3; 707/736; 707/769

(58) Field of Classification Search
None
See application file for complete search history.

(56) References Cited

U.S. PATENT DOCUMENTS

| | | | |
|---|---|---|---|
| 2005/0083413 A1* | 4/2005 | Reed et al. | 348/211.99 |
| 2006/0240862 A1* | 10/2006 | Neven et al. | 455/550.1 |
| 2007/0061302 A1* | 3/2007 | Ramer et al. | 707/3 |
| 2008/0132209 A1* | 6/2008 | Willey | 455/412.2 |
| 2008/0147730 A1* | 6/2008 | Lee et al. | 707/104.1 |
| 2008/0267504 A1* | 10/2008 | Schloter et al. | 382/181 |
| 2009/0132504 A1* | 5/2009 | Vegnaduzzo et al. | 707/4 |
| 2010/0027974 A1* | 2/2010 | Ansari | 386/124 |

* cited by examiner

*Primary Examiner* — Dwayne Bost
*Assistant Examiner* — Christopher Kohlman

(57) ABSTRACT

This disclosure details the implementation of methods, systems and computer program products for remote business contact identification (hereinafter, "RBCI"). RBCI systems implement a remote business identification application whereby users may submit rich media including indicative information of at least one target business entity to a RBCI service provider, and the service provider may identify the target business entity within its database and return the contact information of the target business entity to the user instantly.

22 Claims, 8 Drawing Sheets

METHODS, SYSTEMS AND COMPUTER PROGRAM PRODUCTS FOR A REMOTE BUSINESS CONTACT IDENTIFIER

BACKGROUND

A variety of business contact information services exist to provide potential business customers the contact information of a particular business entity. For example, a potential customer may look up the telephone number of the particular business entity in a phone book (e.g. the Yellow Pages), or by calling national 4-1-1 to make an inquiry. Global positioning system (GPS) devices have also come about. For example, nearly all new cell phones sold in America have some GPS receiving capability built in.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for a remote business contact identifier (hereinafter, "RBCI"). RBCI systems implement a live application whereby users may obtain business and contact information of one (or more) target business entity and be automatically connected to the target business entity via a communication network by submitting indicative information of the target business to the RBCI service provider. For example, in some embodiments, the indicative information of the target business may be rich media files, such as, but not limited to images, video and/or audio clips, and/or the like.

Figure 1A:
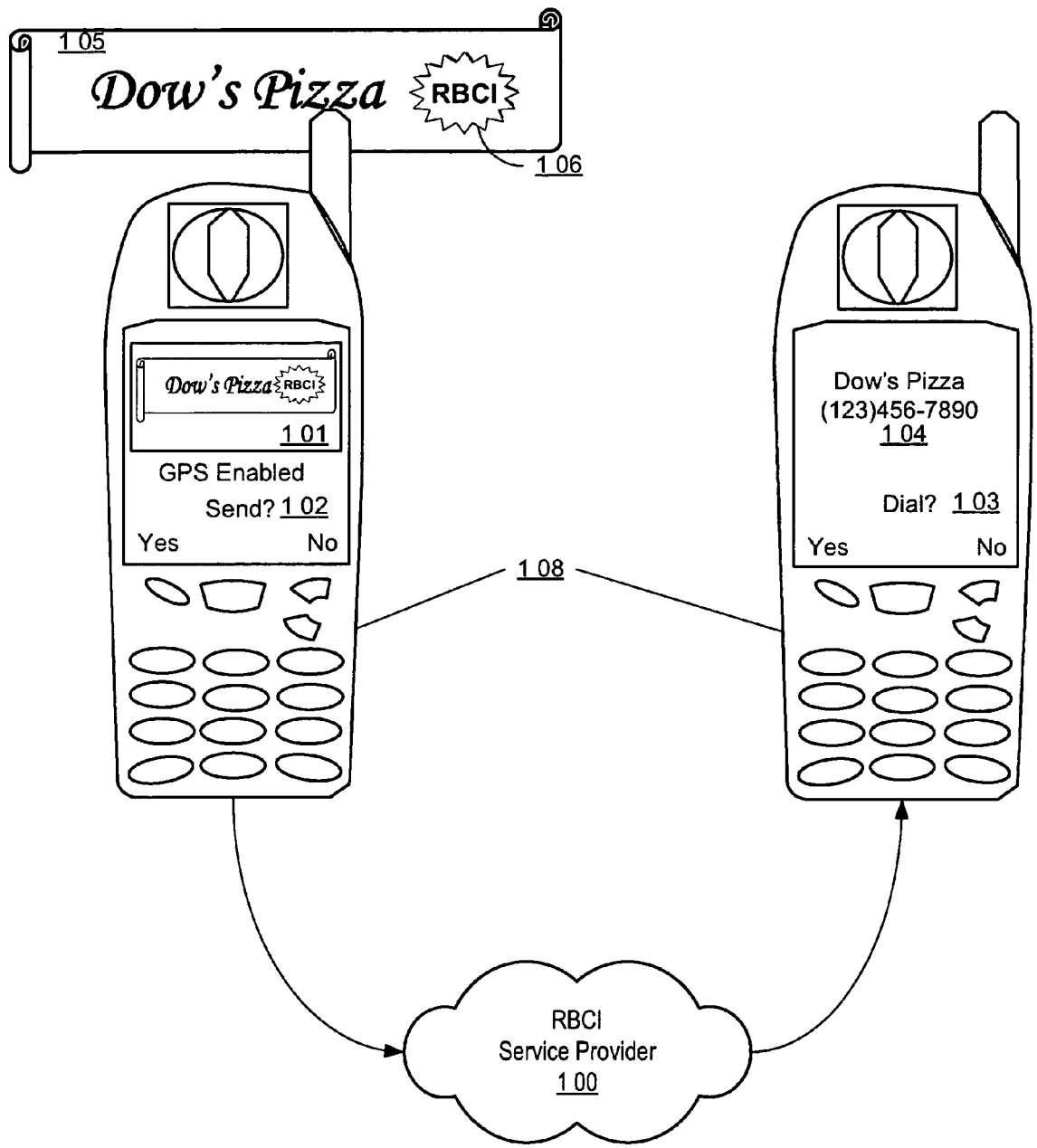
FIGS. 1A and 1B provide an overview of an implementation of data flow between a Remote Business Contact Identifier (hereinafter "RBCI") system and affiliated entities in one embodiment of RBCI operation.

For example, in one embodiment, as will be further illustrated in FIG. 1A, in order to get contact information of a target business entity, a user may point his/her mobile device which has a built-in camera on a target business, and take a picture of the target business entity (e.g. the store front, sign, billboard etc) which may have a "RBCI" label on it to indicate it is enabled for RBCI service. By way of example only, the target business entity may include, but not limited to a store front, a sign, a billboard, an advertisement on media publication, a logo on company vehicles, and/or the like. The user may then send the picture to a RBCI service provider, and may be provided the contact information (e.g. the phone number, etc.) of the target business through his/her mobile device and an option to dial the number of the target business. For example, in one implementation, if the user submits a picture taken at the front door of a restaurant, the RBCI system may provide the phone number of the exact restaurant to the user. In another implementation, if the original target business entity is a logo from a magazine, advertisement, vehicle, and/or the like the RBCI system may then provide the user the contact information (e.g. phone number and street address, etc.) of at least one store associated with the logo, such as a location closest to the user at his/her instant location.

In one embodiment, a method is disclosed, comprising: receiving rich media related to at least one business entity from a user mobile device; determining user location information based on the received data from the user mobile device; extracting recognition information of the at least one business entity from the received rich media; forming a query based on the extracted recognition information of the at least one business entity within a radius surrounding the determined user location in a business database; retrieving contact information related to the at least one business entity from the business database based on the query; and providing the retrieved contact information related to the identified at least one business entity to the user mobile device.

It is to be understood that, depending on the particular needs and/or characteristics of a RBCI user, administrator, server, data payload, monetization model, hardware configuration, network framework, and/or the like, various embodiments of the RBCI may be implemented that enable a great deal of flexibility and customization. The instant disclosure discusses embodiments of the RBCI primarily within the context of wireless cellular communications. However, it is to be understood that the system described herein may be readily configured/customized for a wide range of other applications or implementations. For example, aspects of the RBCI may be adapted for wired telephony services, computer-based communications, and/or the like applications. It is to be understood that the RBCI may be further adapted to other implementations or communications and/or data transmission applications.

FIG. 1A provides an overview of an implementation of schematic user interface on a mobile device and data flow in one embodiment of RBCI operation. In such an embodiment, a user may employ his/her mobile device 108, which may have a built-in camera, to take a picture 101 of a business entity "Dow's Pizza" 105 as indicative information of the target business, when he/she sees the "Dow's Pizza" 105 is attached with a label "RBCI" 106 to indicate it is enabled for RBCI service. The picture may be taken at its front door, commercial sign, billboard, and/or the like. In one implementation, The user may then send the picture 101 to a RBCI service provider 100 through multimedia message service (EMS). In another implementation, the mobile device 108 may be enabled with a RBCI application program 102, which may display a "GPS enabled" message and inquire the user whether to send the picture 101 to the RBCI service provider 100. The RBCI service provider 100 may then identify the contact information of the target business based on the received indicative information, which is a digital picture of Dow's Pizza sign in this embodiment, and the GPS information of the mobile device, as will be further illustrated in FIG. 3A-3C. When the RBCI service provider 100 has successfully located the contact information of Dow's Pizza, the user may then receive the phone number of Dow's Pizza 104 on his/her mobile device 108 from the RBCI service provider 100, and an option to dial 103 may also provided. In a further implementation, the RBCI application program associated with the mobile device 108 may inquire the user whether to add the contact information of Dow's Pizza to the user's phone book stored on the mobile device 108.

Figure 1B:
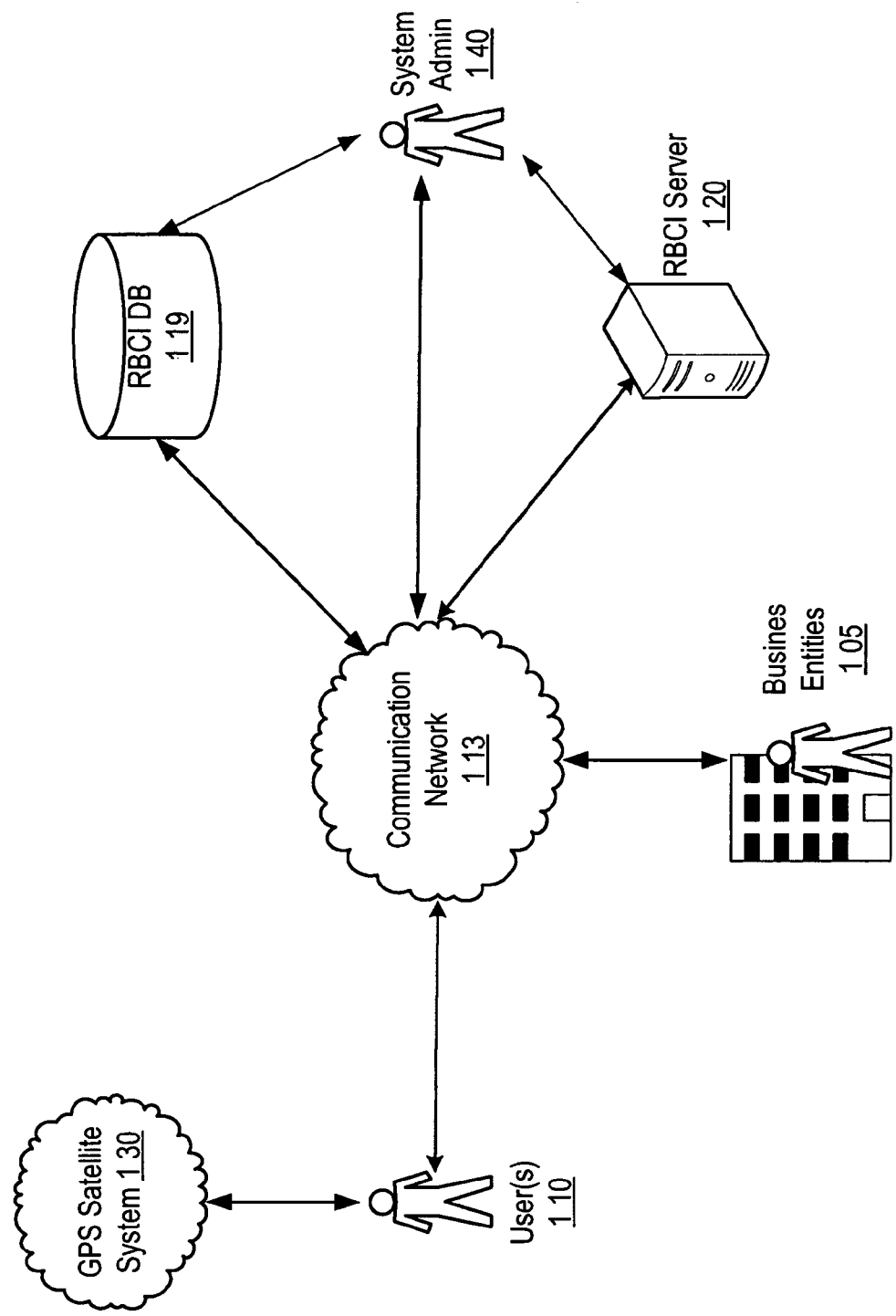

FIG. 1B provides an overview of an implementation of data flow between a RBCI system and affiliated entities in one embodiment of RBCI operation. In FIG. 1B, a user (or users) 110, a RBCI server 120, a RBCI database 119, a system administrator 140 and business entities 105 are shown to interact via a communication network 113 during a RBCI operation. The user 110 may employ a wide variety of different communications devices within embodiments of RBCI operation. For example, in one embodiment, devices such as a cellular telephony handset with or without a GPS receiver, a blackberry, a palmtop computer with telephony functionality, and/or the like. In one embodiment, the user 110 may submit a RBCI service request and indicative information of one (or more) target business entity 105 to the RBCI server 120 via the communication network 113. For example, in some embodiments, the indicative information may be a digital picture or a video clip of the target business sent through MMS or a RBCI specialized application, a handwritten or typed text message including the name and/or the address of the target business, and/or the like. In other embodiments, the indicative information may be submitted to the RBCI server 120 by the user 110 directly calling the RBCI service and articulating the name and/or the address of the target business. In one embodiment, if the user's mobile device is equipped with a built-in GPS receiver, the user 110 may interact with a GPS satellite system 130 by sending and/or receiving satellite signals on the mobile device to obtain GPS information of his/her own. The obtained GPS information may be transmitted to the RBCI server 120 via the communication network 113 together with the indicative information upon the RBCI service request. The RBCI server 120 may be a central server over the communication network 113, or a distributed server serving users within a particular location range. For example, in one embodiment, a RBCI server may be associated with a base station of a cellular network, serving mobile device users within the cell coverage. In another embodiment, a central RBCI server may coordinate with a number of different base stations, receiving and processing service requests of mobile device users forwarded by each base station.

In one implementation, the RBCI server 120 may submit the received indicative information of one or more target businesses together with its GPS location information to a RBCI database 119. In some embodiments, a RBCI server 120 may be integrated with a local RBCI database 119. In another embodiment, a RBCI server 120 may access a remote RBCI database 119 via the communication network 113. The RBCI server 120 and the RBCI database 119 may then exchange search information to identify the target business. For example, in one embodiment, the RBCI database may provide a list of businesses within a location range of the submitted GPS location information to the RBCI server 120. The RBCI server 120 may compare the indicative information of the target business with the stored business information, and then return indications to the RBCI database 119 to indicate whether the target business is identified, and to determine whether to enlarge the location range if target not identified.

At some point when the search process is finished, the RBCI server 120 may send the identified business and contact information to the user 110 via the communication network 113. In one implementation, the information returned to the user 110 may include a pick list of businesses within a location range. The user may then submit a selection and/or a "direct connect" request to the RBCI server 120. The RBCI server 120 may then coordinate with the communication network 113 to establish a connection between the user 110 and the target business entity 105. For example, in one embodiment, the RBCI server 120 may send an indication and the number of the business entity to a cellular base station wherein the user 110 is located, and the base station may then schedule a call between the mobile device of the user 110 and the target business entity 105 with a telephone switch.

A system administrator 140 may communicate with the RBCI server 120 and the RBCI database 119 for regular maintenance, service failure, system updates, database renewal, and/or the like. In one embodiment, the system administrator 140 may directly operate with the RBCI server 120 and the RBCI database 119 on an in-house basis. In another embodiment, the system administrator 140 may remotely access the RBCI server 120 and the RBCI database 119 and perform its functionality via the communication network 113. In one implementation, the system administrator 140 may receive reports of service failure from the RBCI server 120 if the RBCI server fails to identify the target business requested by a user. In that case, the system administrator 140 may conduct a manual search and resort to third party resources, e.g. yellowbook.com, GPS database, and/or the like. The system administrator 140 may then return the result to the RBCI server 120 and update the RBCI database 119 accordingly. In another implementation, the system administrator 140 may serve as a call center representative. If the user determines to call the RBCI service provider, he/she may choose to talk to the system administrator 140 to identify the target business.

Figure 2:
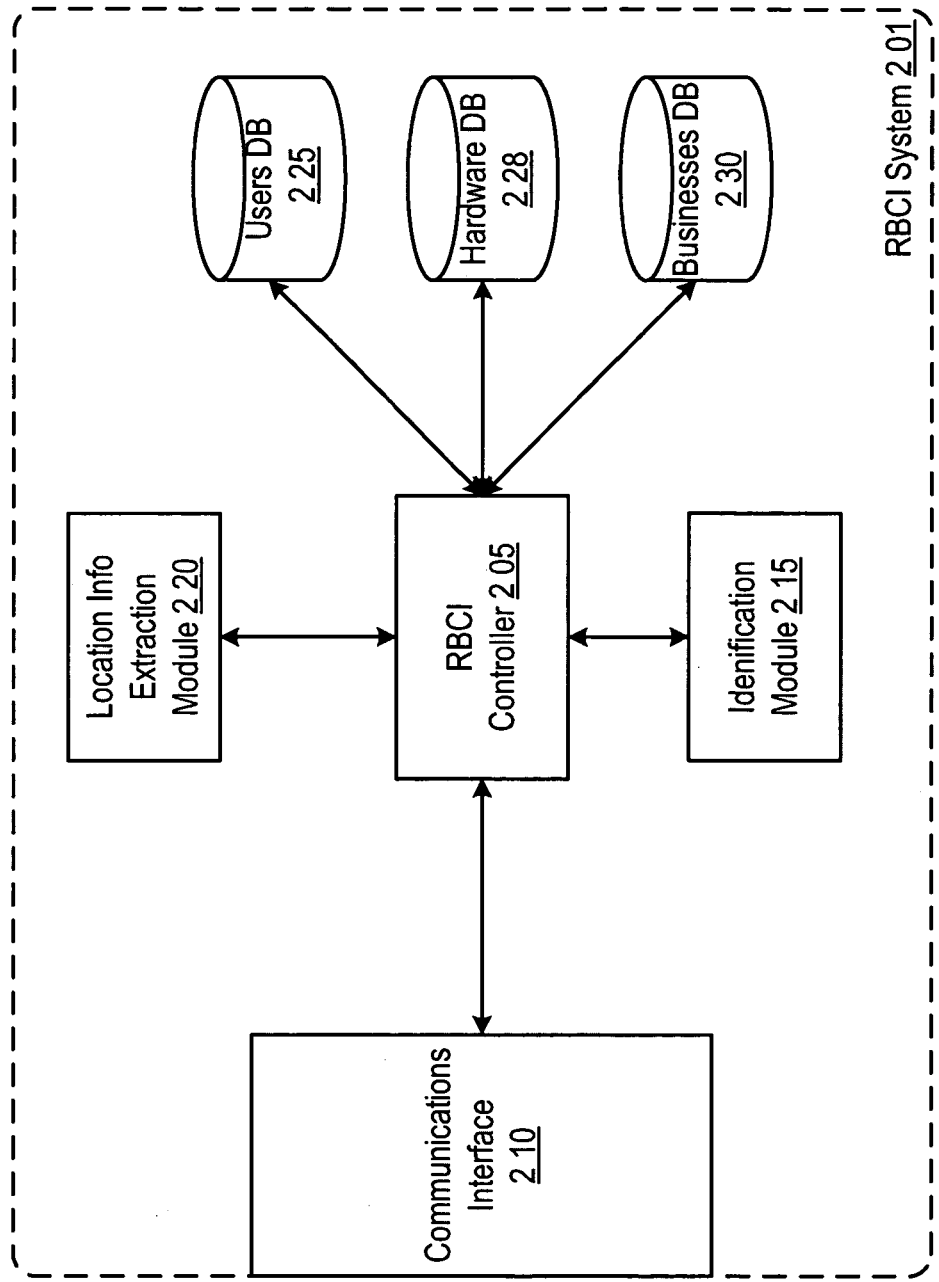
FIG. 2 shows an implementation of RBCI system components in one embodiment of RBCI operation.

FIG. 2 shows an implementation of RBCI system components in one embodiment of RBCI operation. The RBCI system 201 may contain a number of functional modules and/or data stores. A RBCI controller 205 may serve a central role in some embodiments of RBCI operation, serving to orchestrate the reception, generation, and distribution of data and/or instructions, to, from, and between RBCI modules and/or mediate communications with external entities and systems.

In one embodiment, the RBCI controller 205 may be housed separately from other modules and/or databases within the RBCI, while in another embodiment, some or all of the other modules and/or databases may be housed within and/or configured as part of the RBCI controller. Further detail regarding implementations of RBCI controller operation, modules, and databases is provided below.

In the implementation illustrated in FIG. 2, the RBCI controller 205 may be configured to couple to external entities via a communications interface 210. The communications interface may, for example, configure indicative information received from a user via a communication network, and receipt and/or transmission of data to an external and/or network database. In various implementations, a communications interface 210 may, for example, serve to configure data into application, transport, network, data link, and/or physical layer formats in accordance with a TCP/IP communications model. The communications interface 210 may further be configurable to implement and/or translate Session Initiation Protocol (SIP), Voice over Internet Protocol (VOIP), and/or the like data formats and/or protocols. The communications interface 210 may further house one or more ports, jacks, antennas, and/or the like to facilitate wired and/or wireless communications with and/or within the RBCI system.

In one implementation, the RBCI controller 205 may further be coupled to a plurality of modules configured to implement RBCI functionality and/or services. An identification module 215 may, in one implementation, be configurable to receive and/or process indicative information of one (or more) target business entities sent by one or more users. For example, in some embodiments, the identification module 215 may receive indicative information of one (or more)

target business entities together with GPS information of the sender (user). The identification module 215 may, in one implementation, be further configurable to communicate with business database 230 to initiate an identification process. For example, the identification module 215 may send the indicative information of target business to the business database 230 to compare it with the stored business information within a location range of the user. In some embodiments, GPS information of the user may not be submitted to the RBCI system 201. For example, the user mobile device may not be equipped with a built-in GPS receiver, or the GPS service is temporarily unavailable at the time the service request is submitted, and the user may not submit his/her location information manually (e.g. in a text message). In such cases, a location information extraction module 220 may, in one implementation, be configurable to receive and/or process data signals pertaining to determining the location of the sender. The location information extraction module 220 may, for example, in some embodiments, analyze the information embedded in the received data signals from the user, reconstruct the location information of the user, and provide the result to the RBCI controller 205. For example, as will be further illustrated in FIG. 3B, in one embodiment, the location information extraction module 220 may employ technologies such as, but not limited to GPS localization, cell tower triangulation, Wi-Fi Positioning System (WPS), and/or the like.

In one implementation, the RBCI controller 205 may further be coupled to one or more databases configured to store and/or maintain RBCI data. A users database 225 may contain information pertaining to callers and/or call recipients, contact information, profile information, identities of hardware devices, Customer Premise Equipments (CPEs), and/or the like associated with users, service preferences, service history, system settings, and/or the like. A hardware database 228 may contain information pertaining to hardware devices with which the RBCI system may communicate, such as but not limited to voicemail servers, user telephony devices, CPEs, gateways, routers, and/or the like. The hardware database 228 may specify transmission protocols, data formats, and/or the like suitable for communicating with hardware devices employed by any of a variety of RBCI affiliated entities. A business database 230 may contain data pertaining to business entities recorded previously and/or updated by the system administrator, which includes information such as, but not limited to the name of a business, the address of a business, the contact information, the URL address on the World Wide Web (WWW), and/or the like.

The RBCI database may be implemented using various standard data-structures, such as an array, hash, (linked) list, struct, structured text file (e.g., XML), table, and/or the like. For example, in one embodiment, the XML for the User Profile in the user database 225 may take the following form:

```
<User>
    <Quasi-static info>
        <User_ID>123-45-6789</User_ID>
        <Hardware ID> Nokia 660 </Hardware ID>
        <Census info> John Smith; 123 Maple Dr., Smalltown,
            CA 92676; (123)456-7890;
    jsmith@email.com; 55 years; male; white; married; 2 children; etc.
        </Census info>
        <Interests> Italian cuisine; fishing; classic cars; movies; etc.
        </Interests>
        <Contact restrictions> Weekdays 8 AM - 7 PM only
        </Contact restrictions>
    </Quasi-static info>
```

```
<Dynamic info>
    <Service record>
        <Service_#1>
            <Time> 08/21/2006 13:45:28 </Time>
            <Geocode> GPS 40 46.516 -73 57.98
            </Geocode>
            <Code>
                <Subject> restaurant;
            </Subject>
                <Source> picture taken;
    "DIG0004325.JPG";</Source>
                <Search Match> Dow's Pizza
            </Search Match>
            </Code>
        </Service_#1>
        <Service_#2>
        etc...
        </Service_#2>
        etc...
    </Service record>
    <Service statistics>
        <Popular businesses> restaurants; cars; travel; etc.
        </Popular businesses>
        <Trajectories> Data files listing time and geocode
            coordinates, computed average
trajectories, likely locations, etc.
        </Trajectories>
        etc...
    </Service statistics>
</User>
```

In one embodiment, data accumulated in a plurality of user profiles may be analyzed to extract statistic information about popular businesses associated with the user. For example, the frequency with which a particular business under a particular subject is searched may be extracted from user profiles and parsed by geographic, temporal, and/or demographic criteria to yield code profiling information. This information may be stored in a code and/or Ad profile associated with the business database 230.

Figure 3A:
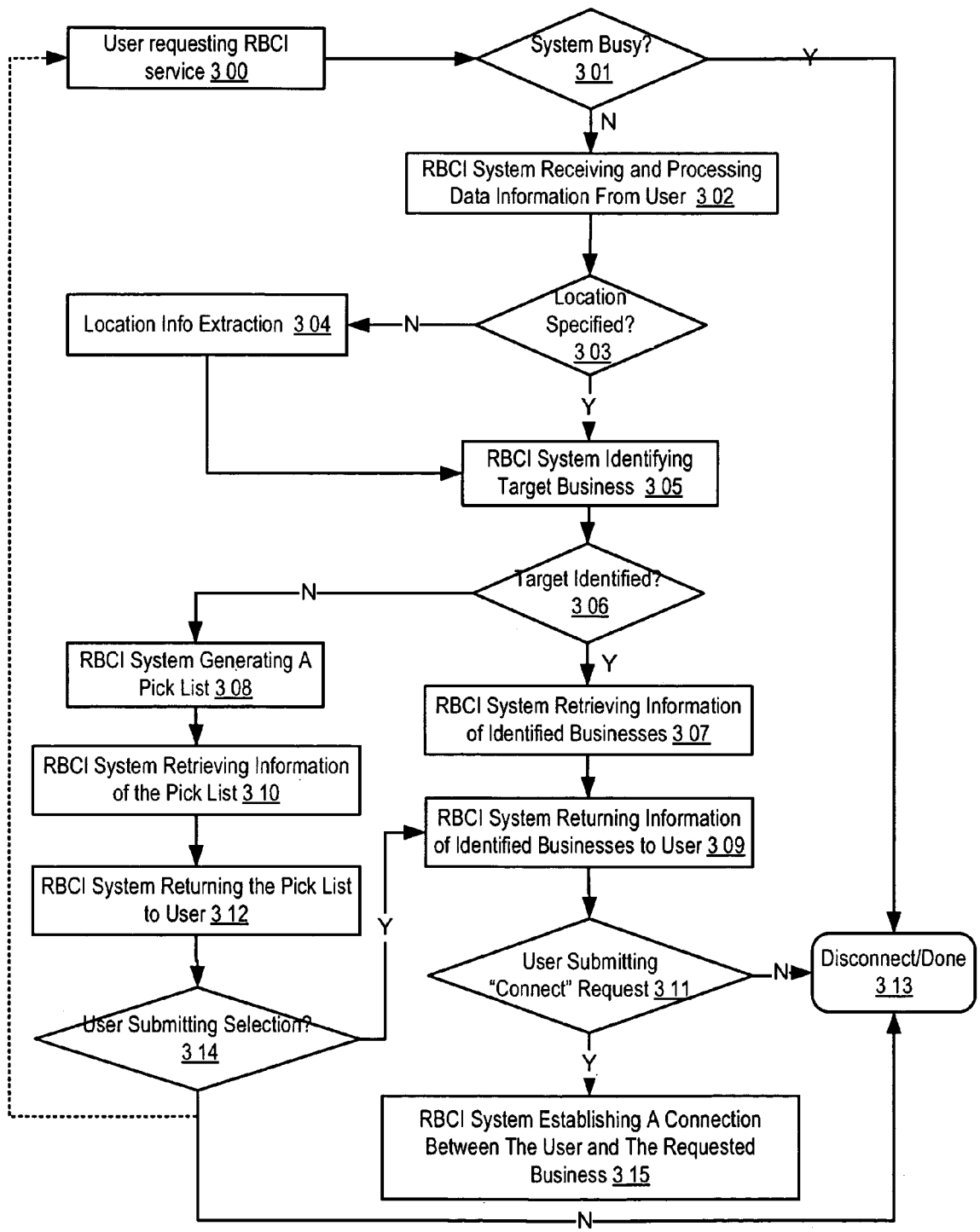
FIGS. 3A-3C show implementations of logic flow in embodiments of RBCI operation.
Figure 3B:
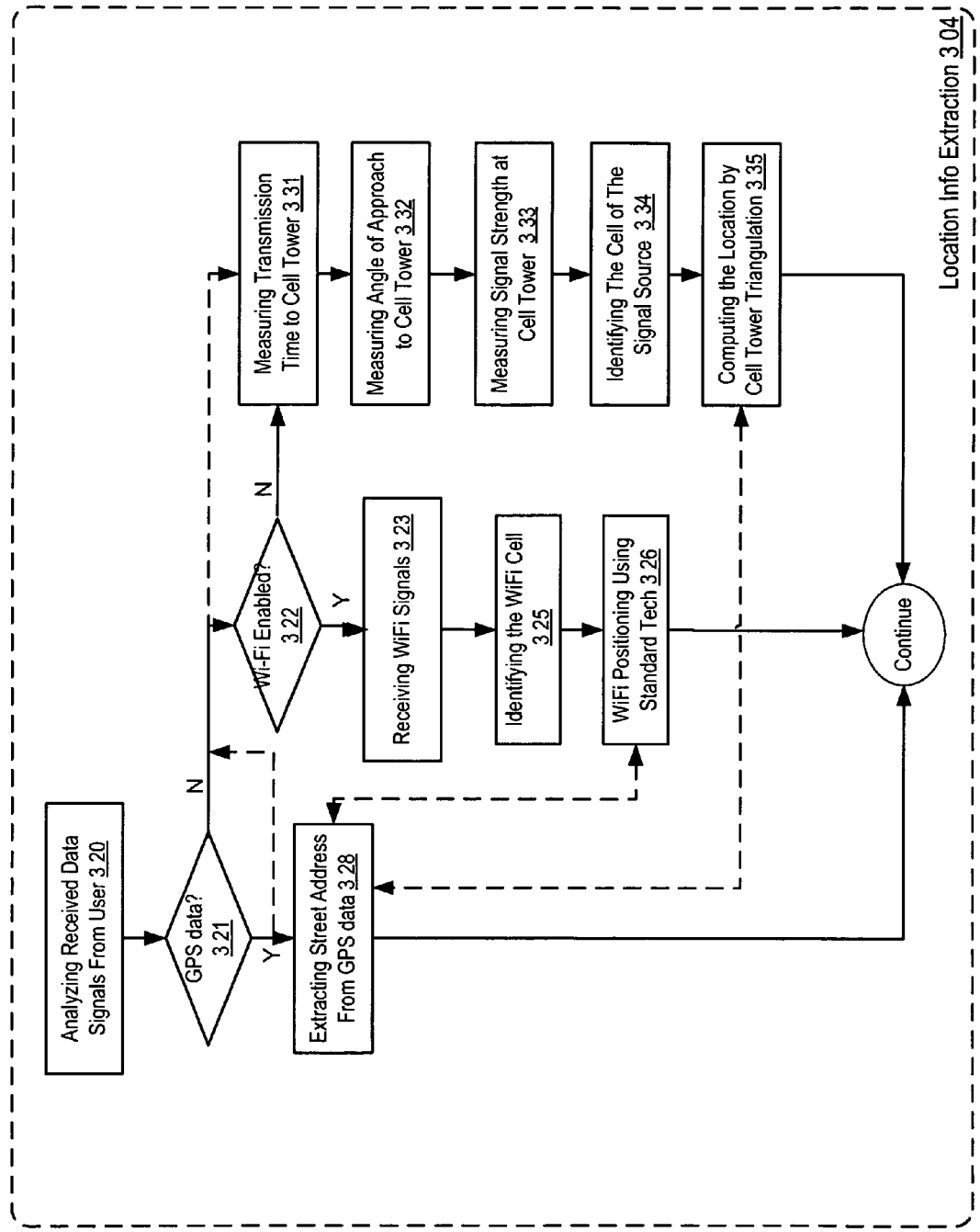
Figure 3C:
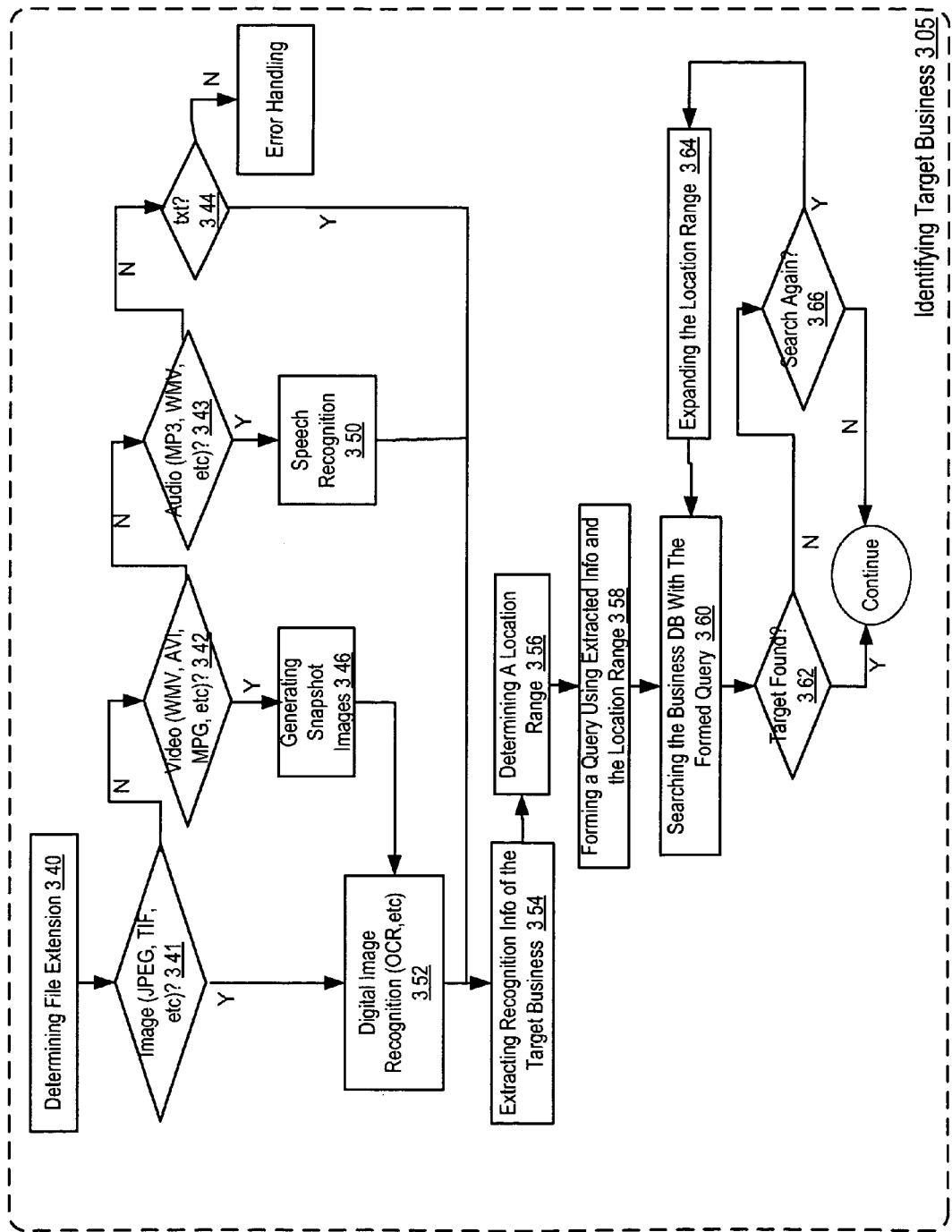

FIGS. 3A-3C show implementations of logic flow in embodiments of RBCI operation. FIG. 3A is an overview logic flow diagram illustrating aspects of RBCI operation. In FIG. 3A, a user may initiate the RBCI service process by submitting a service request and indicative information of one (or more) target business entity 300. For example, in one embodiment, if the user's mobile device is equipped with a built-in camera or video camera, the user may point the device at the target business entity to take a picture or a video clip and send the picture or the video clip to a RBCI service provider. A RBCI application program installed on the user's mobile device may be launched to facilitate the process, as illustrated in FIG. 1A. In one implementation, if the user device is equipped with a GPS receiver, the photo or video clip taken by the user may be automatically embedded with GPS data. For example, in one implementation, if media files are saved in a format that supports Exchangeable Image File Format (Exif) specification, such as, but not limited to JPEG, TIFF Rev 6.0, RIF WAV, and/or the like. Such formats may be embedded with Exif metadata tags that include GPS records such as the latitude and longitude of the photographing spot. In another implementation, the RBCI application installed at the user mobile device may request the street address from the GPS satellite system and automatically send the specified address to the RBCI service provider. In another implementation, the user may manually specify the street address of the business entity by spelling it in the filename of the photo or video clip taken, or editing and sending it in an MMS together with the rich media file. In another embodiment, the user may call the RBCI service provider and articulate the name and/or an indication of the address (e.g. zip code, street name, etc) of the target business entity. In another embodiment, the user may manually input the name and/or the indication of the address of the target business entity and send a text message to the RBCI service provider.

If the RBCI system is busy 301, the user request may not be processed, and the user may choose to disconnect from the system 313 or resubmit the request 300. If the RBCI system is not busy, the system may receive and process the data submitted by the user 302 which includes at least indicative information of one (or more) target business entity. The RBCI system may then decide whether location information of the user is specified 303 in the submitted data. For example, as discussed above, in one implementation, the street address may be specified by the user in a text message, but in another implementation, the submitted data may only include rich media with metadata without specified street address, or even no indication of location is submitted by the user. If location information is not available at step 303, the RBCI system may perform an extra procedure to extract location information 304 of the user, as will be illustrated in FIG. 3B.

The RBCI system may then identify the target business based on the received indicative information and the location information 305, as will be illustrated in FIG. 3C. In one embodiment, the RBCI system may employ a search in the RBCI business database by comparing the received indicative information with stored business information. In another embodiment, the RBCI system may pass on the indicative information to an external database, lookup service and/or the like to expand the scope of the search. If the target business is successfully identified, business and contact information of the identified business may be retrieved 307 from the RBCI database and returned to the user 309, wherein the business and contact information may include, but is not limited to, address of the business, telephone number of the business, URL address of the business, brief description of the business, and/or the like. In one embodiment, such information may be displayed on the screen of the user's mobile device. In another embodiment, if the user initiated the RBCI service by calling the service provider and articulating the name and/or the address of the business entity, the RBCI system may present a pre-recorded audio file in the RBCI database of the business and contact information of the target business to the user during the call. On the other hand, if the target business is not identified in the RBCI database, the RBCI system may generate a pick list of business within a location range of the target business 308, and may retrieve information from the RBCI database and associate it with every business on the pick list 310. The RBCI system may then return the pick list to the user 312 in similar manners to those discussed above. If the user further submits a selection 314 from the pick list, the target business entity may then be successfully identified. In one embodiment, the user may select an item from the display screen of the mobile device by compressing a key on the keyboard of the mobile device, or pressing the item on a touchable screen of the mobile device, or send a message to the RBCI system to indicate the choice, and/or the like. In another embodiment, if the user is on a call with the RBCI service provider, the user may articulate his/her choice. If the user does not submit such selections, the RBCI service may either be terminated or abandoned by disconnection from the RBCI system 313, or the RBCI service may be invoked by the user requesting service again 300. In one embodiment, when the contact information of the target business entity is returned to the user, the user may be provided the option to save the information of the target business in his/her contact list. For example, in one implementation, an application installed on the user mobile device may be automatically launched when it receives the contact information of the target business, and display a "save as contact?" screen to the user.

At some point after the user has received identification information of the target business, the user may submit a "connect" request 311 to the RBCI system, and the RBCI system may establish a communicative connection between the user and the business entity through a communication network 315. In one embodiment, the user may compress the "Yes" or "Dial" key on the keyboard of the mobile device to send a signal to the RBCI system indicating the desire to connect to the identified business. In another embodiment, if the user calls the RBCI service provider, he/she may articulate a dialing request to the RBCI service on the phone. In a further embodiment, if the mobile device of the user is enabled to access the World Wide Web and a URL address of the identified business is available, the user may also request to visit the website of the business through the program menu of the mobile device, and the RBCI system may connect to and display the website of the business on the user's mobile device via the Internet backbone. If the user does not submit further request for connection at step 311, the RBCI system may terminate the service and disconnect with the user 313 at some point after.

FIG. 3B shows implementations of logic flow in embodiments of location information extraction 304 within RBCI operation. In one embodiment, if location information of the user is not specified to the RBCI system, the system may extract the location information of the user from the received data information. The RBCI system may analyze the received signals from the user 330 to determine whether GPS data is included 321. If GPS data is included, the RBCI system may then extract the street address of the user from the GPS data such as the latitude and longitude of the user. If GPS data is not included or is incomplete, the RBCI system may then determine whether the user handheld device is enabled with Wi-Fi service 322. The RBCI system may then receive Wi-Fi signals 323 from the user if it is available, and determine geographical location of the user using Wi-Fi as the underlying reference system. In one implementation, the system may identify the Wi-Fi cell of the user 325, and employ Wi-Fi positioning technology to locate the user 326, such as, but not limited to Skyhook WPS, Slashgeo Wi-Fi Positioning Expansion, and/or the like. In some implementations, the RBCI system may also integrate GPS localization 328 with Wi-Fi positioning 326 to enable hybrid positioning.

In one embodiment, if Wi-Fi is not enabled on the user device, and GPS data is not available or incomplete, the RBCI system may then estimate the location of the user through cell tower triangulation modeling. In one implementation, the RBCI system may measure the transmission time of signals from the user to arrive at a cell tower 331, the angle of the signals approaching the cell tower antennas 332, and the received signal strength at the cell tower 333. The RBCI system may then identify the cell of the signal source (user) 334, and compute its location via cell tower triangulation models 335. In another embodiment, the RBCI system may also integrate GPS localization 328 with cell tower triangulation 335 to identify the location, for example, when GPS data is vague or incomplete.

FIG. 3C shows implementations of logic flow in embodiments of identifying the target business within a RBCI operation. In some embodiments, the RBCI system may determine the data format of the received indicative information of the target business entity by identifying the extension name of the file 340. If it is an image file (e.g. JPG, TIF, etc.) 341, the system may the proceed with a digital image recognition procedure 352. For example, in one embodiment, the system may employ Optical Character Recognition (OCR) software such as, but not limited to Datacap OCR, and/or the like, to generate digitalized image data. If it is not an image file, the system may continue to determine whether it is a video file (e.g. WMV, AVI, MPG, etc.) 342. If yes, the RBCI system may generate snapshot images of the video clips. For example, in one implementation, the RBCI system may employ video screenshot software, such as, but not limited to Able Video Snapshot, Xilisoft Video Snapshot, and/or the like, to capture screen images intermittently. The generated snapshot images may also be processed with digital image recognition 352. If the submitted file is neither an image nor a video clip, the system may proceed to determine whether it is an audio file 343. If yes, the system may then perform a speech recognition procedure 350 to record the content of the audio file. For example, in one embodiment, the system may employ speech recognition software such as, but not limited to Dragon NaturalSpeaking, LumenVox, and/or the like, to convert speech to texts. If the submitted file is not rich media, the system may then determine whether it is a pure text file 344 ready for further processing. If it is not a text file either, the RBCI systems may report and handle an error, such as, but not limited to sending an "invalid data" notice to the user 348.

In one embodiment, the RBCI system may extract recognition data 354 from the received information based on its specific format, as discussed above. Meanwhile, the system may also determine a location range 356 for further query based on the determined target location as discussed in FIG. 3B. A search query may be formed based on the extracted recognition data and the location range 358, and the business database may then be searched with the formed query 360. If the target business is found in the search 362, the RBCI system may proceed with step 307 as illustrated in FIG. 3A within RBCI operation. If the target business is not found in the search, the RBCI system may then determine whether to conduct another search 366 with enlarged location range 364, or to proceed with step 308 of FIG. 3A. In one embodiment, the location ranges for subsequently formed queries are automatically increased by the RBCI system according to predetermined algorithms. For example, in one implementation, the location range may be enlarged by including areas within the range of the closest zip code to that of the existing location range. In one embodiment, the number of attempts for the RBCI system to search for the target business in the database may be predetermined, such as, but not limited to by a system administrator and/or the like. In one embodiment, if the target business is not successfully located, the RBCI system may provide the user an option to connect to a system administrator, for example, a RBCI service call center representative. The system administrator may then conduct a manual search and resort to third party resources, e.g. yellowbook.com, GPS database, and/or the like.

Figure 4:
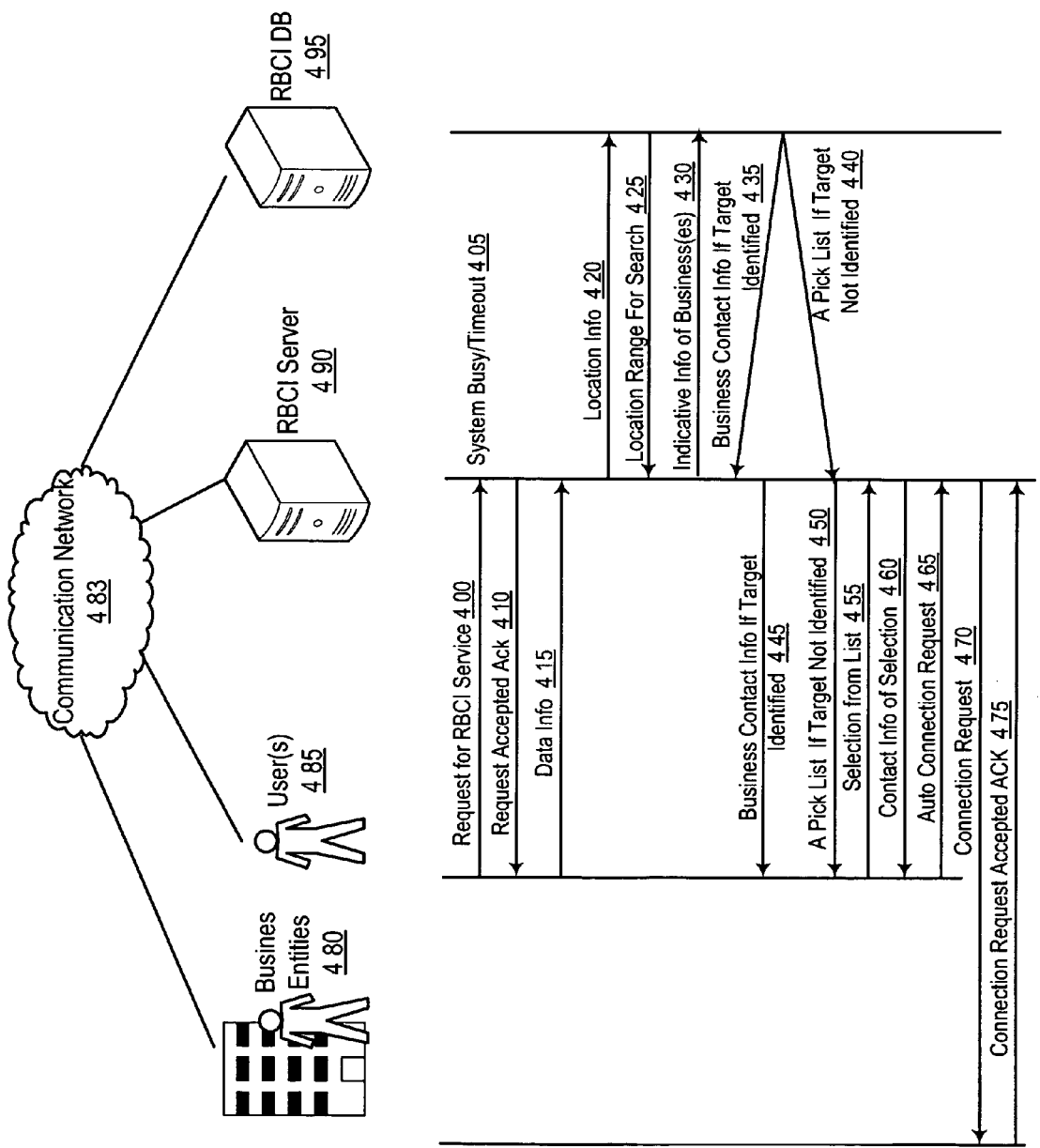
FIG. 4 shows aspects of an implementation of combined logic and data flow of connection setup and business contacts search in embodiments of RBCI operation.

FIG. 4 shows aspects of an implementation of combined logic and data flow in embodiments of RBCI operation. The figure shows an implementation of communications between one (or more) business entity 105, one (or more) user 110, a RBCI system server 120, and a RBCI database 495 via a communication network 483. The implementation illustrated in FIG. 4 employs communication protocols such as, but not limited to direct connect, Ethernet, cellular data communication protocols (e.g. GSM, CDMA, etc.), wireless application protocols (WAP), IEEE 802.11a-x, and/or the like. At 400, the user 485 may submit a request for RBCI service to the RBCI server 490. If the server is busy, the connection is unsuccessful and a timeout may occur 405. If the server is not busy, the RBCI server may return a request accepted acknowledgement 410 to the user 485, and the user 485 may send data information 415 which includes indicative information of the target business, and GPS information of the user 485 to the RBCI server 490 thereafter. If GPS information is not included at 415, then the RBCI server may discern the location information of the user as illustrated in FIG. 3B. The RBCI server 490 may then submit the received GPS information, or the extracted location information of the user 485, to the RBCI database 495. In return, the RBCI database 495 may provide a list of stored businesses within a location range for a search 425. At this point the RBCI system may submit the indicative information of the target business to the RBCI database for the search. If the target business is identified in the RBCI database 495, business and contact information of the target business may be submitted to the RBCI server 490 at 435 by the RBCI database and then returned to the user 485 at 445. On the other hand, if the target business is not identified, a pick list may be generated by the RBCI database 495 and returned to the RBCI server 490 at 440, and then passed on to the user 485 at 450. In that case, the user 485 may further submit a selection 455 from the pick list to the RBCI server 490, and in return, the RBCI server 490 may send the business and contact information of the selected business back to the user 485.

In a further implementation, the user 485 may submit a request to the RBCI server 490 to connect to the identified business 465. Upon receiving such requests, the RBCI server 490 may send a probing request for connection 470 to the identified business entity 480 based on its contact information. If the business entity 480 accepts the connection request and returns an acknowledgement signal 475, a communicative connection between the user 485 and the business entity 480 has been established.

RBCI Controller

Figure 5:
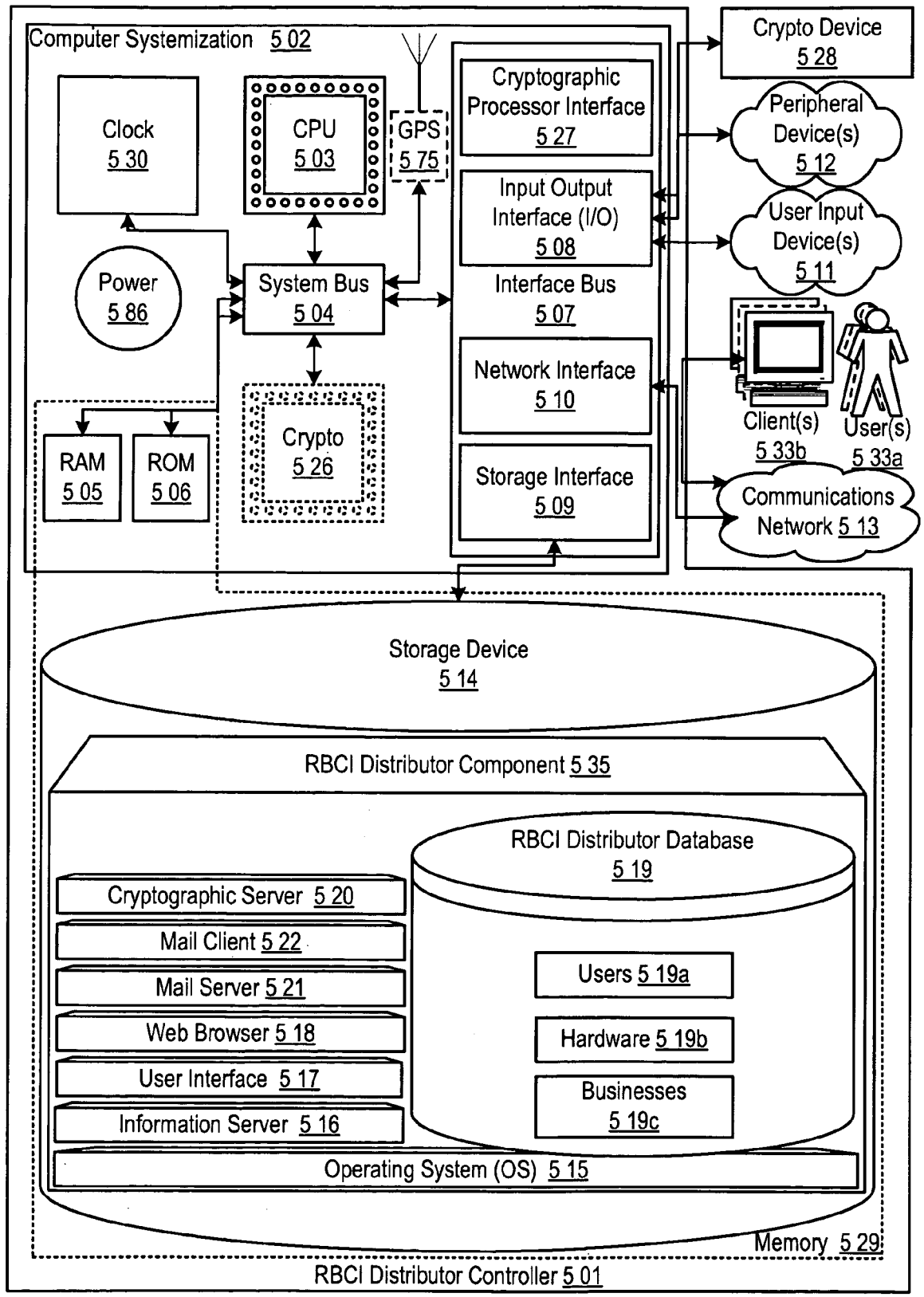
FIG. 5 is of a block diagram illustrating exemplary embodiments of a RBCI controller.

FIG. 5 of the present disclosure illustrates inventive aspects of a RBCI controller 501 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the RBCI controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The RBCI controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, the foregoing are all interconnected and/or communicating through a system bus 504. Optionally, the computer systemization may be connected to an internal power source 586. Optionally, a cryptographic processor 526 and/or a global positioning system (GPS) component 575 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the RBCI controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the RBCI thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(es) 507 may accept, connect, and/or communicate to a number of interface adapters, conventionally although not necessarily in the form of adapter cards, such as, but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the RBCI controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the RBCI controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the RBCI controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource; thus, any number of memory embodiments may be employed in lieu of or in concert with one another. It is to be understood that the RBCI controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the RBCI component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the RBCI controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the RBCI controller to communicate with other entities through a communications network 513. Various communication protocols may be used by the RBCI controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the RBCI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the RBCI database 519, operating systems, other program components, user interfaces, Web browsers, and/or the like.

Access to the RBCI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the RBCI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the RBCI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in entity of a Web browser and information server, a combined application may be developed to perform similar functions of both. The combined application would similarly affect the obtaining and the provision of information to users, user agents, and/or the like from the RBCI enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the RBCI.

Access to the RBCI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the RBCI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the RBCI component to engage in secure transactions if so desired. The cryptographic component facilitates the secure accessing of resources on the RBCI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The RBCI Database

The RBCI database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the RBCI database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the RBCI database is implemented as a data-structure, the use of the RBCI database 519 may be integrated into another component such as the RBCI component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-c. A Users table 519a may include fields such as, but not limited to: user_ID, user_name, user_password, contact_info, hardware_ID, mobile_device_type, usage_history, and/or the like. A Hardware table 519b may include fields such as, but not limited to: hardware_ID, hardware_type, hardware_name, data_formatting_requirements, protocols, addressing_info, usage_history, hardware_requirements, user_ID, and/or the like. A business table 519b may include fields such as, but not limited to: business_name, business_ID, business_category, business_address, business_contact, business_number, business_email, business_homepage, business_symbol, business_digital_image, business_content, and/or the like. These tables may support and/or track multiple entity accounts on the RBCI controller.

In one embodiment, the RBCI database may interact with other database systems. For example, employing a distributed database system, queries and data access by search RBCI component may treat the combination of the RBCI database, an integrated data security layer database as a single database entity.

In one embodiment, user programs may contain various user interface primitives, which may serve to update the RBCI. Also, various accounts may require custom database tables depending upon the environments and the types of clients the RBCI may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-c. The RBCI may be configured to keep track of various settings, inputs, and parameters via database controllers.

The RBCI database may communicate to and/or with other components in a component collection, including itself, and/or or facilities of the like. Most frequently, the RBCI database communicates with the RBCI component, other program components, and/or the like. The database may contain, retain, and provide information regarding other nodes and data.

The RBCI Component

The RBCI component 535 is a stored program component that is executed by a CPU. In one embodiment, the RBCI component incorporates any and/or all combinations of the aspects of the RBCI that was discussed in the previous figures. As such, the RBCI affects accessing, obtaining and the provision of information, services, transactions, and/or the like across various communications networks.

The RBCI component is configurable to access, calculate, engage, exchange, generate, identify, instruct, match, process, search, serve, store, and/or facilitate transmission of indicative information of target business entities, contact information of target business entities, and/or the like between RBCI components and/or affiliated entities, and use of the RBCI.

The RBCI component enabling access of information between nodes may be developed by employing standard development tools and languages such as, but not limited to: Apache components, Assembly, ActiveX, binary executables, (ANSI) (Objective-) C (++), C# and/or NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the RBCI server employs a cryptographic server to encrypt and decrypt communications. The RBCI component may communicate to and/or with other components in a component collection, including itself, and/or facilities of the like. Most frequently, the RBCI component communicates with the RBCI database, operating systems, other program components, and/or the like. The RBCI may contain, communicate, generate, obtain, and/or provide program component, system, user, and/or data communications, requests, and/or responses.

Distributed RBCIs

The structure and/or operation of any of the RBCI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the RBCI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method, comprising:
receiving rich media related to at least one business entity from a user mobile device;
determining user location information based on the received data from the user mobile device;
determining a data format of the received rich media;
identifying a plurality of candidate recognition procedures associated with the data format;
selecting an identified recognition procedure from the plurality of candidate recognition procedures based on the data format;
extracting a business identifier string of the at least one business entity from the received rich media in accordance with the selected recognition procedure;
forming via a processor a contact information search query based on the extracted business identifier string of the at least one business entity and the determined user location in a business database;
retrieving contact information related to the at least one business entity from the business database based on the search query;
storing in a user profile information about the search query, including the at least one business entity, geographic, temporal and demographic criteria;
analyzing a plurality of user profiles of users to extract statistical information about business entities associated with the users;
storing the extracted statistical information about the business entities in Ad profiles associated with the business entities; and
providing the retrieved contact information related to the at least one business entity to the user mobile device.

2. The method of claim 1, wherein the user mobile device comprises a cellular phone mobile device.

3. The method of claim 1, wherein the receiving rich media related to at least one business entity from the user mobile device further comprises:
establishing a communicative connection between a user and a service provider; and
receiving the rich media related to the at least one business entity in at least one multimedia format from the user via the communicative connection.

4. The method of claim 3, wherein the service provider further comprises a server storing a list of business contact information.

5. The method of claim 1, wherein the rich media related to the at least one business entity comprises at least one of the following: (i) images of the at least one business entity; (ii) audio clips recording names or addresses of the at least one business entity; (iii) video clips recording the at least one business entity; or (iv) text messages stating name and address of the at least one business entity.

6. The method of claim 5, wherein the images and the video clips of the at least one business entity have embedded GPS satellite information.

7. The method of claim 1, wherein the determining user location information based on the received data from the user mobile device further comprises:
collecting location information of the user from GPS satellite information.

8. The method of claim 1, wherein the determining user location information based on the received data from the user mobile device further comprises:
extracting location information of the user using Wi-Fi positioning.

9. The method of claim 1, wherein the determining user location information based on the received data from the user mobile device further comprises:
computing the user location through cell tower triangulation.

10. The method of claim 1, wherein the extracting business identifier string of the at least one business entity from the received rich media comprises:
determining the data format of the received rich media;
performing a recognition procedure on the received rich media; and
generating digitalized recognition data of the received rich media.

11. The method of claim 10, wherein the recognition procedure further comprises at least one of the following: (i) optical character recognition of graphics; (ii) speech recognition; or (iii) text message processing.

12. The method of claim 1, wherein the forming a query based on the extracted business identifier string of the at least one business entity and the determined user location in a business database comprises:
when the at least one business entity is not located by a first query, forming a second query based on the extracted business identifier string of the at least one business entity and the determined user location in the business database,
wherein the second query is associated with an expanded location range from the determined user location.

13. The method of claim 1, wherein the retrieving contact information related to the at least one business entity from the business database based on the query comprises:
when an exact match of the at least one business is identified, retrieving the contact information of the exact matched at least one businesses from the database; and
when an exact match of the at least one business is not identified, retrieving the contact information of a pick list of businesses within a radius surrounding the determined user location from the database.

14. The method of claim 13 further comprising:
receiving from the mobile device a selection from the pick list to identify the at least one business entity.

15. The method of claim 1, further comprising:
receiving a user connection request; and
automatically establishing a communicative connection between the user mobile device and the at least one business entity based on the provided contact information in response to the user connection request.

16. The method of claim 15, wherein the automatically establishing a communicative connection between the user mobile device and the at least one business entity based on the provided contact information based on the user connection request comprises:
connecting the user mobile device and the at least one business entity via a communication network without manual user dialing.

17. The method of claim 1, wherein analyzing a plurality of user profiles to extract statistical information about business entities associated with users comprises:
extracting a frequency each business entity is searched for by the users from the plurality of user profiles; and
parsing the frequency of search by the geographic, temporal, and/or demographic criteria.

18. The method of claim 1 further comprising:
receiving a connect request from the mobile device; and
establishing a communicative connection between the user and the al least one business entity through a communication network.

19. A system, comprising:
a processor;
a memory in communication with the processor and containing program instructions;
an input and output device in communication with the processor and memory comprising a graphical interface;
wherein the processor executes program instructions contained in the memory and the program instructions comprise:
receive rich media related to at least one business entity from a user mobile device;
determine user location information based on the received data from the user mobile device;
determine a data format of the received rich media;
identify a plurality of candidate recognition procedures associated with the data format;
select an identified recognition procedure from the plurality of candidate recognition procedures based on the data format;
extract a business identifier string of the at least one business entity from the received rich media in accordance with the selected recognition procedure;
form a query based on the extracted business identifier string of the at least one business entity within a radius surrounding the determined user location in a business database;
retrieve contact information related to the identified at least one business entity from the business database based on the query;
store in a user profile information about the search query, including the business entity, geographic, temporal and demographic criteria;
analyze a plurality of user profiles of users to extract statistical information about business entities associated with the users;
store the extracted statistical information about the business entities in Ad profiles associated with the business entities; and
provide the retrieved contact information related to the identified at least one business entity to the user mobile device.

20. A non-transitory computer readable medium, comprising:
processor readable instructions stored in the computer readable medium, wherein the processor readable instructions are issuable by a processor to:
receive rich media related to at least one business entity from a user mobile device;

determine user location information based on the received data from the user mobile device;
determine a data format of the received rich media;
identify a recognition procedures associated with the data format to obtain an identified recognition procedure;
select the identified recognition procedure from a plurality of candidate recognition procedures based on the data format;
extract a business identifier string of the at least one business entity from the received rich media in accordance with the selected recognition procedure;
form a query based on the extracted business identifier string of the at least one business entity within a radius surrounding the determined user location in a business database;
retrieve contact information related to the identified at least one business entity from the business database based on the query;
store in a user profile information about the search query, including the business entity, geographic, temporal and demographic criteria;
analyze a plurality of user profiles of users to extract statistical information about business entities associated with the users;
store the extracted statistical information about the business entities in Ad profiles associated with the business entities; and
provide the retrieved contact information related to the identified at least one business entity to the user mobile device.

21. A processor-implemented method, comprising:
receiving at least one digital rich media clip of at least one business entity taken by a user mobile device, wherein the at least one digital rich media clip contains GPS satellite information if the mobile device is equipped with a GPS receiver;
receiving location information of the user mobile device, wherein the receiving location information comprises at least one of:
    collecting location information of the user from GPS satellite information when GPS satellite information of the user is available,
    extracting location information of the user using Wi-Fi positioning when the user mobile device is enabled with Wi-Fi, and
    computing the user location through cell tower triangulation;
determining a data format of the at least one digital rich media clip;
identifying a recognition procedure associated with the data format to obtain an identified recognition procedure;
selecting the identified recognition procedure from a plurality of candidate recognition procedures based on the data format, wherein the plurality of candidate recognition procedures includes:
    an optical character recognition procedure when the data format is an image,
    an intermittent snapshot image generation procedure and an optical character recognition procedure when the data format is a video clip, and
    a speech recognition procedure when the data format is an audio clip;
performing the selected recognition procedure on the received at least one digital rich media clip;
extracting digitalized business identifier string data of the at least one digital rich media clip;
forming via a processor a query based on the extracted business identifier string data of the at least one business entity within a radius surrounding the determined user location in a business database;
selecting at least one stored business in the database based on the query, wherein the selecting at least one store business comprises:
    when the at least one business is identified by the query, selecting the identified at least one business in the database, and
    when the at least one business is not identified by the query, selecting a pick list of businesses in the database within a location range of the at least one business entity;
retrieving contact information related to the selected at least one business entity from the database;
storing in a user profile information about the query, including the business entity, geographic, temporal and demographic criteria;
analyzing a plurality of user profiles to extract statistical information about business entities associated with users;
storing the extracted statistical information about the business entities in Ad profiles associated with the business entities; and
providing the retrieved contact information related to the at least one business entity to the user mobile device.

22. The method of claim 21, wherein analyzing a plurality of user profiles to extract statistical information about business entities associated with users comprises:
    extracting a frequency each business entity is searched for by the users from the plurality of user profiles; and
    parsing the frequency of search by the geographic, temporal, and/or demographic criteria.

* * * * *